June 14, 1927.  L. F. DOUGLASS  1,632,221
METHOD AND APPARATUS FOR PRODUCING VARIABLE IMAGE EFFECTS IN PHOTOGRAPHY
Filed Sept. 28, 1925
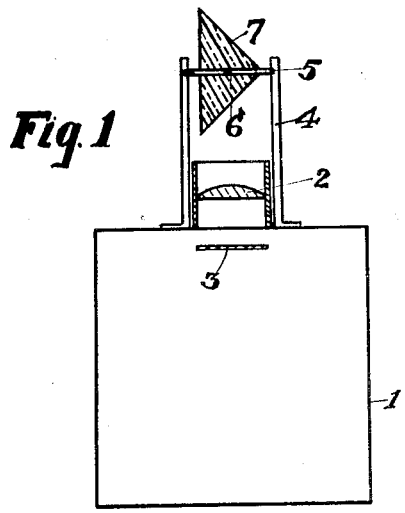
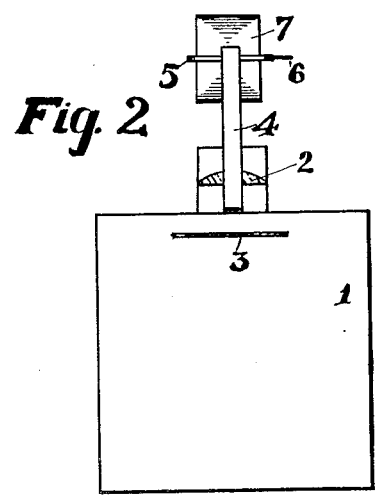
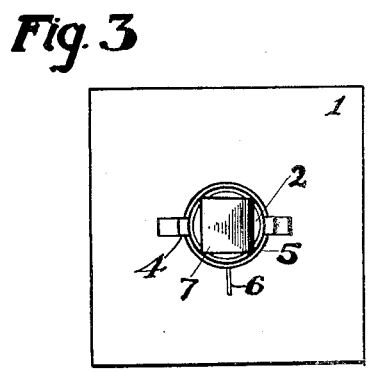
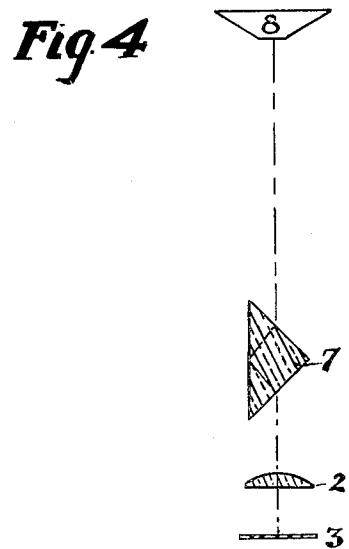
INVENTOR
Leon F. Douglass
BY
J. E. Trabucco
ATTORNEY Patented June 14, 1927.

1,632,221

UNITED STATES PATENT OFFICE.

LEON F. DOUGLASS, OF MENLO PARK, CALIFORNIA.

METHOD AND APPARATUS FOR PRODUCING VARIABLE IMAGE EFFECTS IN PHOTOGRAPHY.

Application filed September 28, 1925. Serial No. 59,024.

The present invention relates to the novel method and apparatus for producing images of a scene or object on a photographic film by successive exposures, each image being produced on the film in a different position from the preceding exposure.

An object of my invention is to provide a novel method and improved apparatus whereby images of an object or scene may be produced in different positions on a photographic film by successive exposures. For instance, by means of my invention a complete cinematographic film can be produced upon which a stationary boat may be made to appear as though it were rocking.

A further object of the present invention is to provide apparatus of the kind just characterized which may be readily applied to any motion picture camera.

Stated briefly, the invention comprises in combination with a sensitized film and a lens for focusing images onto said film, a light refracting member, positioned in the path of the light rays proceeding from a scene to the camera lens, having means attached thereto for manipulating it, whereby the position of the light rays registering on the film may be changed at will.

In the accompanying drawings:

Fig. 1 is a top view of a camera, showing my invention applied thereto;

Fig. 2 is a side view of the same;

Fig. 3 is a front view thereof; and

Fig. 4 is a diagrammatic view illustrating the path of the light rays proceeding through my apparatus to the photographic film located in the camera.

Referring to the drawing the numeral 1 represents a moving picture camera of the usual construction, having a camera lens 2 and a cinematographic film 3 located therein.

To the lens tube of the camera or to the camera structure itself is secured a frame 4, comprised of two supporting members provided at their ends with grooves suitable in size to accommodate and movably hold the ring 5. The ring 5 is provided with a handle 6, which permits its being manipulated in a circular direction, inside the grooves of the frame 4.

The ring 5 is rigidly secured to and encircles a large-angle, light-refracting prism 7, the large angle of which is of approximately 90 degrees.

The prism 7 may be moved in a semi-circular direction backward and forward on its axis which is parallel to the axis of the camera lens 2, through the manipulation of ring 5 through its handle 6, thereby changing the position on the film 4 of the image refracted by the prism through the said camera lens.

The light rays from a scene to be photographed, designated by the numeral 8 on the drawing, proceed to the front surface of the prism 7 and are refracted thereby to the large surface or base of said prism, which said surface reflects the said rays to the rear surface of said prism, and upon their coming into the air again they are refracted and travel through lens 2 to the photographic film 3 where the image of the scene or object is produced in a vertically inverted position. Upon moving the handle 6, the prism 7 is changed in position, thereby changing the position of the image refracted thereby onto film 3. When the prism 7 is in the position shown on the drawing the image produced on the film assumes an upright and natural position, but as the prism is moved either backward or forward in a semi-circular direction through the manipulation of handle 6, the image refracted by the prism onto the film assumes a tilted position, the degree or angle of the tilt depending upon the movement of the handle.

By successively exposing the film to the light rays proceeding through the prism 7 and the camera lens 2, as the prism is moved on its said axis backward and forward in a semi-circular direction, the image will appear on succeeding frames of the film in different positions.

Thus with the apparatus shown, and by successively exposing a film to the light rays, from say a stationary boat, which proceed through the prism as it is moved backward and forward in a semi-circular direction on its axis, a complete film can be produced, which, when the images thereon are projected on a screen will show the boat rocking backward and forward.

It can be clearly perceived that by moving the prism 7 to a more or less degree the image refracted thereby through the camera lens 2 will assume a tilted position on the film dependent upon the amount of movement of the prism. Thus if the prism is moved in a complete circle the image produced on the film will turn completely over.

Although the apparatus I have described for manipulating the prism has been shown with more or less detail, it is evident that other forms may be used with equal satisfaction; I therefore do not desire to be limited to the exact forms herein shown, the appended claims being referred to for the clear and concise limits of my invention.

Having described my invention what I claim is:

1. A device for producing images of an object in different positions on a photographic film comprising a lens, a large-angle 90-degree prism positioned in the path of the lights rays from said object and in front of the lens, having its hypotenuse lying in a plane parallel to the axis of the lens and its front and rear surfaces disposed to the said axis of the lens so that the front surface refracts the light rays from the object to the hypotenuse, the hypotenuse reflects the said rays to the rear surface and the rear surface refracts the said rays through the lens onto a film.

2. A device for producing images of an object in different positions on a photographic film comprising a lens, a large-angle 90-degree prism positioned in front of the lens and in the path of the light rays from the object having its hypotenuse lying in a plane substantially parallel to the axis of the lens and its front and rear surfaces disposed to the said axis of the lens so that the front surface refracts the light rays from the object to the hypotenuse, the hypotenuse reflects the said light rays to the rear surface and the rear surface refracts the said light rays through the lens onto the film, and means for moving the prism whereby the light rays directed onto the film by the prism may be changed to different positions.

LEON F. DOUGLASS.